US011521609B2

(12) United States Patent
Yamamoto (10) Patent No.: US 11,521,609 B2
(45) Date of Patent: Dec. 6, 2022

(54) VOICE COMMAND SYSTEM AND VOICE COMMAND METHOD (71) Applicant: KYOCERA Corporation, Kyoto (JP)

(72) Inventor: Yumiko Yamamoto, Funabashi (JP)

(73) Assignee: KYOCERA CORPORATION, Kyoto (JP)

( * ) Notice: Subject to any disclaimer, the term of this patent is extended or adjusted under 35 U.S.C. 154(b) by 140 days.

(21) Appl. No.: 16/651,349

(22) PCT Filed: Sep. 26, 2018

(86) PCT No.: PCT/JP2018/035687
§ 371 (c)(1),
(2) Date: Mar. 27, 2020

(87) PCT Pub. No.: WO2019/065733
PCT Pub. Date: Apr. 4, 2019

(65) Prior Publication Data
US 2020/0273457 A1 Aug. 27, 2020

(30) Foreign Application Priority Data

Sep. 28, 2017 (JP) .............................. JP2017-188264

(51) Int. Cl.
G10L 17/04 (2013.01)
G10L 15/22 (2006.01)
(Continued)

(52) U.S. Cl.
CPC ............ *G10L 15/22* (2013.01); *G06F 16/433* (2019.01); *G06F 21/32* (2013.01); *G06V 40/50* (2022.01);
(Continued)

(58) Field of Classification Search
CPC ... G10L 15/22; G10L 15/07; G10L 2015/223; G10L 17/04; G10L 17/22;
(Continued)

(56) References Cited

U.S. PATENT DOCUMENTS 5,897,616 A * 4/1999 Kanevsky ............... G10L 17/22
704/270.1
2007/0143833 A1* 6/2007 Conley ................... G06F 21/32
726/5
(Continued)

FOREIGN PATENT DOCUMENTS

JP 2002-251199 A 9/2002
JP 2003-271565 A 9/2003
(Continued)

*Primary Examiner* — Abul K Azad
(74) *Attorney, Agent, or Firm* — Hauptman Ham, LLP (57) ABSTRACT A voice command system according to a first disclosure comprises a gateway apparatus having an interface configured to receive a voice command, and a controller configured to perform a registration process of registering a speaker permitted to receive the voice command. The controller is configured to perform an authentication process of rejecting a reception of the voice command when a speaker of the voice command is not registered, and permitting a reception of the voice command when a speaker of the voice command is registered. The controller is configured to perform the authentication process for each voice command.

18 Claims, 8 Drawing Sheets (51) Int. Cl.
  *G06F 16/432* (2019.01)
  *G06F 21/32* (2013.01)
  *G10L 15/07* (2013.01)
  *G06V 40/50* (2022.01)

(52) U.S. Cl.
  CPC ........ *G10L 15/07* (2013.01); *G10L 2015/223* (2013.01); *G10L 2015/227* (2013.01)

(58) Field of Classification Search
  CPC ......... G10L 15/00–15/34; G10L 17/00–17/26; G06F 16/433; G06F 21/32; G06K 9/00926
  USPC .......................................................... 704/273
  See application file for complete search history.

(56) References Cited

U.S. PATENT DOCUMENTS

| | | | |
|---|---|---|---|
| 2012/0158189 A1* | 6/2012 | Cho | H04L 12/2829 700/276 |
| 2012/0245941 A1 | 9/2012 | Cheyer | |
| 2013/0173268 A1* | 7/2013 | Weng | G10L 17/24 704/249 |
| 2013/0332165 A1* | 12/2013 | Beckley | G10L 15/20 704/246 |
| 2015/0162004 A1 | 6/2015 | Goesnar et al. | |
| 2015/0162006 A1* | 6/2015 | Kummer | H04N 21/41265 704/275 |
| 2015/0235642 A1 | 8/2015 | Nishikawa et al. | |
| 2019/0043509 A1* | 2/2019 | Suppappola | G10L 17/00 |

FOREIGN PATENT DOCUMENTS

| | | |
|---|---|---|
| JP | 2012123500 A | 6/2012 |
| JP | 2012-256276 A | 12/2012 |
| JP | 2015-215433 A | 12/2015 |

* cited by examiner

| INDEX INFORMATION | GUIDANCE INFORMATION | | | |
|---|---|---|---|---|
| | EQUIPMENT NAME | INSTALLATION INFORMATION | INSPECTION INFORMATION | USE INFORMATION |
| | | | | |
| | | | | |
| ... | ... | ... | ... | ... |

FIG. 4

| INDEX INFORMATION | EQUIPMENT NAME | SENSING DATA | ERROR CODE | STATISTICAL DATA | REFERENCE DATA | OPERATION HISTORY |
|---|---|---|---|---|---|---|
|  |  |  |  |  |  |  |
|  |  |  |  |  |  |  |
|  |  |  |  |  |  |  |
| ... | ... | ... | ... | ... | ... | ... |

FIG. 5

| INDEX INFORMATION | FULL NAME OR NAME OF USER | USER ADDRESS | EMAIL ADDRESS | TELEPHONE NUMBER | CONTRACTOR INFORMATION | MAINTENANCE INFORMATION |
|---|---|---|---|---|---|---|
|  |  |  |  |  |  |  |
|  |  |  |  |  |  |  |
|  |  |  |  |  |  |  |
| ... | ... | ... | ... | ... | ... | ... |

VOICE COMMAND SYSTEM AND VOICE COMMAND METHOD

The present application is a National Phase of International Application No. PCT/JP2018/035687, filed Sep. 26, 2018, and claims priority based on Japanese Patent Application No. 2017-188264, filed Sep. 28, 2017.

TECHNICAL FIELD

The present invention relates to a voice command system and a voice command method.

BACKGROUND ART

There has been proposed a navigation system that displays various pieces of guidance information on a mobile terminal in maintenance of an equipment (for example, Patent Literature 1).

CITATION LIST

Patent Literature

Patent Literature 1: Japanese application publication No. 2012-256276

SUMMARY OF INVENTION

A voice command system according to a first disclosure comprises a gateway apparatus having an interface configured to receive a voice command. The voice command system comprises a controller configured to perform a registration process of registering a speaker permitted to receive the voice command. The controller is configured to perform an authentication process of rejecting a reception of the voice command when a speaker of the voice command is not registered, and permitting a reception of the voice command when a speaker of the voice command is registered. The controller is configured to perform the authentication process for each voice command.

A voice command method according to a second disclosure comprises a step A of receiving a voice command, a step B of performing a registration process of registering a speaker permitted to receive the voice command, and a step C of performing an authentication process of rejecting a reception of the voice command when a speaker of the voice command is not registered, and permitting a reception of the voice command when a speaker of the voice command is registered. The step C is performed for each voice command.

DESCRIPTION OF EMBODIMENTS

In recent years, the gateway apparatus provided with a user interface such as a voice input interface have been receiving attention. Using such a gateway apparatus, it is conceivable to improve user convenience by supporting an installation, an inspection and a use of the equipment. However, since the gateway apparatus receives voice commands of a plurality of speakers existing near the gateway apparatus, it may not be possible to properly support the installation, the inspection, and the use of the equipment.

The present disclosure provides a voice command system and a voice command method that can appropriately support the installation, the inspection, the use, and the like of the equipment.

Hereinafter, an embodiment will be described with reference to drawings. In the following description of drawings, the same or similar parts are denoted by the same or similar symbols.

However, it should be noted that the drawings are schematic and that dimensional ratios, etc. thereof are different from real ones. Therefore, specific dimensions, etc. should be determined in consideration of the following description. As a matter of course, the drawings include the parts at which mutual dimensional relations or ratios are different from one another.

Embodiment (Voice Command System)

Figure 1:
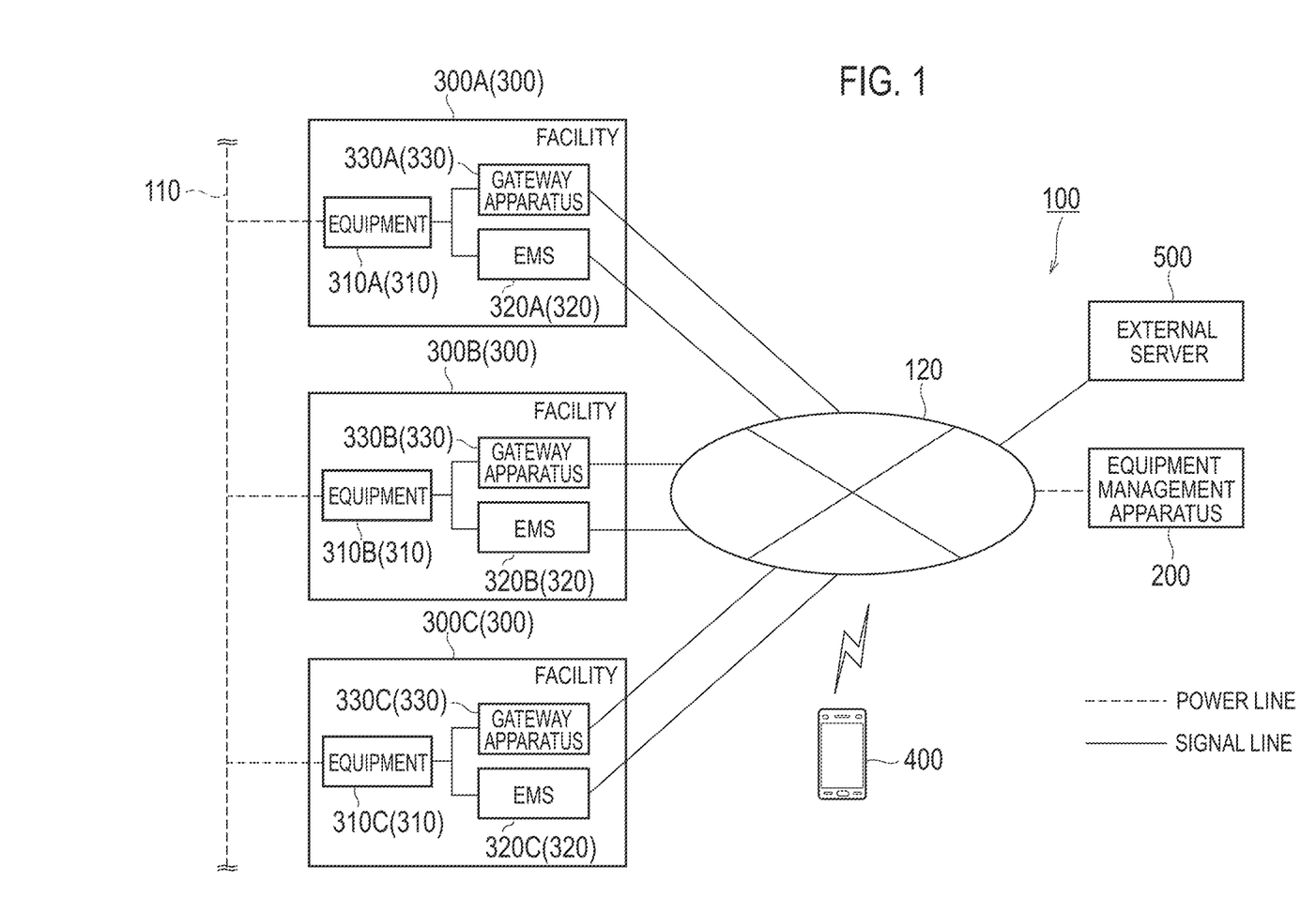
FIG. 1 is a diagram illustrating a voice command system 100 according to an embodiment.

Hereinafter, a voice command system according to the embodiment will be described. As illustrated in FIG. 1, the voice command system 100 has an equipment management apparatus 200, facilities 300, a contractor terminal 400, and an external server 500. In FIG. 1, as the facilities 300, a facility 300A to a facility 300C are shown as examples. The equipment management apparatus 200, the facilities 300, the contractor terminal 400, and the external server 500 are connected to a network 120. The network 120 is only required to provide lines between the equipment management apparatus 200 and the facilities 300, a line between the equipment management apparatus 200 and the contractor terminal 400, and lines between the facilities 300 and the external server 500. For example, the network 120 is the Internet. The network 120 may provide a dedicated line such as a virtual private network (VPN).

The equipment management apparatus 200 manages equipment provided at the facilities 300. Details of the equipment management apparatus 200 will be described later (see FIG. 2).

The facility 300 has the equipment 310, an energy management system (EMS) 320, and a gateway apparatus 330. The equipment 310 is connected to a power grid 110. The equipment 310 may be a power generation equipment. The power generation equipment may be an equipment which generates power by using natural energy such as solar light, wind power, or geothermal heat. The power generation equipment may be a fuel cell apparatus. The equipment 310 may be a storage battery apparatus. The equipment 310 may be a load equipment, which consumes power. The load equipment may be an air-conditioning equipment or a lighting equipment. The facility 300 may have the equipment 310 of two or more types.

The EMS 320 is an apparatus (EMS: Energy Management System), which manages power information indicating power in the facility 300. The power in the facility 300 is the power which flows in the facility 300, the power bought by the facility 300, or the power sold by the facility 300.

The gateway apparatus 330 has an interface, which receives voice commands to operate the equipment 310. The interface includes a sound input interface. The interface may include a sound output interface. The interface may include a button input interface. The interface may include a touch-panel input interface. The interface may include a gesture input interface. A gesture is, for example, an action such as waving the hand toward a camera, which is owned by the interface. The interface may include an image output interface. The gateway apparatus 330 has an Artificial Intelligence (AI) function, and the AI function has a function to analyze voice commands and carries out various actions based on analysis results of the voice commands. The various actions may include an action of acquiring information from a server connected via the network 120 and may include an action of outputting information acquired from the server connected via the network 120. The server may be the equipment management apparatus 200 or may be the external server 500. The various actions may include an action of transmitting a control command based on a voice command or may include an action of receiving a response command for a control command. The gateway apparatus 330 may transmit the control command to the equipment 310 via the EMS 320 or may transmit the control command to the equipment 310 without the intermediation of the EMS 320. The gateway apparatus 330 may be called a smart speaker or AI.

Herein, the gateway apparatus 330 may transmit the information, which is collected by the gateway apparatus 330, to the external server 500. The information, which is collected by the gateway apparatus 330, may be analysis results of voice commands or may be the information acquired from the equipment management apparatus 200.

The contractor terminal 400 may be a terminal which belongs to a contractor that carries out maintenance of the equipment 310. Examples of the maintenance include: a checkup of examining the deterioration state of the equipment, upkeep of carrying out simple services during the checkup, repair of fixing problems of the equipment to recover the originally installed state of the functions and performance of the equipment, and replacement of exchanging the existing equipment for a new equipment.

Herein, the voice command system 100 may have a power management server. For example, the power management server transmits, to the facility 300, a power-flow control message which requests control of the amount of the power flow from the power grid 110 to the facility 300, a reverse-power-flow control message which requests control of the amount of the reverse power flow from the facility 300 to the power grid 110, a power-source control message which requests control of the equipment 310 (distributed power supply) provided in the facility 300, and so on.

The external server 500 may be a server which provides a search engine for searching for required information based on the analysis result of the voice command. The external server 500 may be a server run by an entity, which provides the gateway apparatus 330. The external server 500 may manage the information, which is collected by the gateway apparatus 330, as big data and utilize the managed big data as the information for improving convenience of users.

(Equipment Management Apparatus)

Figure 2:
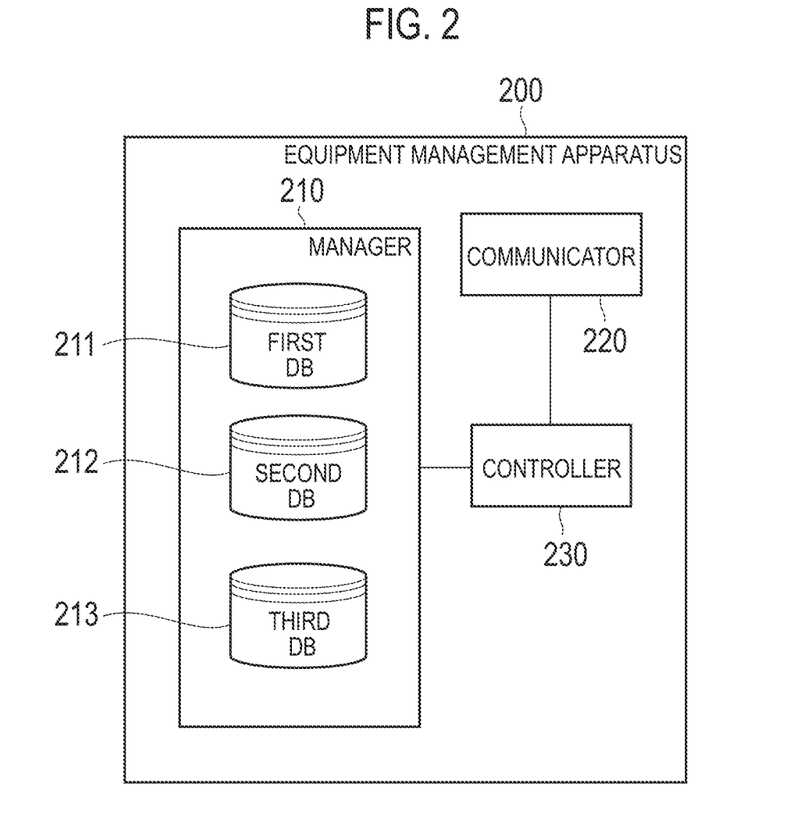
FIG. 2 is a diagram illustrating an equipment management apparatus 200 according to an embodiment.

Hereinafter, the equipment management apparatus according to the embodiment will be described. As illustrated in FIG. 2, the equipment management apparatus 200 has a manager 210, communicator 220, and a controller 230.

The manager 210 includes a storage medium (media) such as a non-volatile memory or/and a HDD and manages information about the plurality of facilities 300. The manager 210 has a first Database (DB) 211, a second Database (DB) 212, and a third Database (DB) 213.

Figure 3:
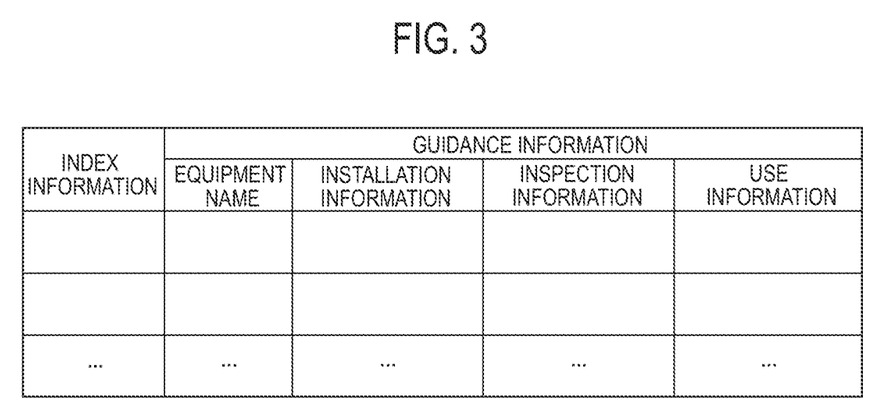
FIG. 3 is a diagram illustrating an example of information stored in a first DB 211 according to an embodiment.

The first DB 211 is an example of a first database storing first information, which allows access of the gateway apparatus 330. The first information includes guidance information about a handling method of the equipment. For example, the guidance information includes at least one of an equipment name, installation information, inspection information, and use information as illustrated in FIG. 3.

The equipment name is the name of the equipment 310. The equipment name may be the information (for example, a product model number, a manufacturer code, etc.) which uniquely identifies the equipment 310 or may be the information which indicates the type (for example, a solar battery apparatus, an air-conditioning equipment, etc.) of the equipment 310.

The installation information is the information required upon installation of the equipment 310 in the facility 300. For example, the installation information is the information indicating an installation procedure of the equipment 310 and is information such as: "Connect cable xx to terminal oo" or "Turn ON power". For example, the installation information may be used by an installation contractor of the equipment 310.

The inspection information is the information required upon inspection of the equipment 310. For example, the inspection information is the information indicating an inspection procedure of the equipment 310 and is information such as: "Is cable xx connected to terminal oo?" or "Is power lamp lighted?". For example, the inspection information may be used by an inspection contractor of the equipment 310. The inspection of the equipment 310 may be inspection carried out after installation of the equipment 310 or may be inspection carried out as upkeep of the equipment 310.

The use information is the information required upon usage of the equipment 310. For example, the use information is the information indicating a usage procedure of the equipment 310 and is information such as: "Turn ON power" or "Press button oo". The use information may be the information indicating functions of the equipment 310 or may be the information indicating troubleshooting of the equipment 310. The use information may be the information used by a user of the equipment 310.

In the embodiment, the first DB 211 may store index information which associates the guidance information, the equipment information, and the user information with one another as illustrated in FIG. 3. The index information includes a combination of arbitrary characters and numbers and is not required to have a meaning by itself.

Figure 4:
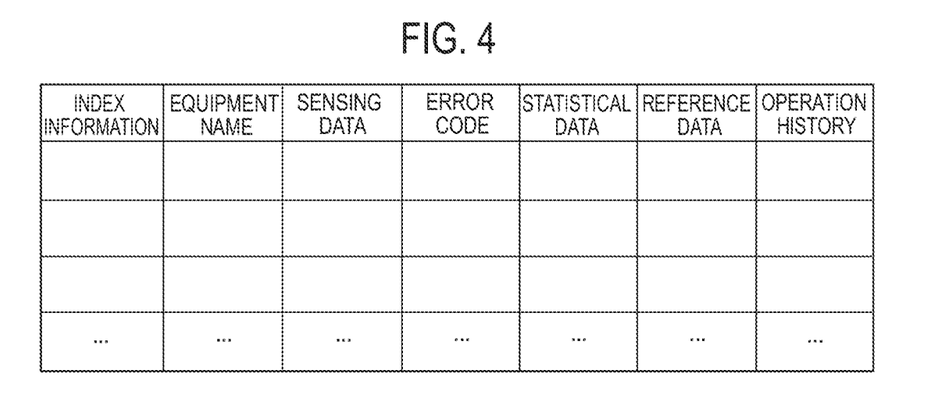
FIG. 4 is a diagram illustrating an example of information stored in a second DB 212 according to an embodiment.

The second DB 212 is an example of a second database storing second information, which prohibits access of the gateway apparatus 330. The second information includes equipment information about the equipment 310. The equipment information is the information collected by the EMS 320, which controls the equipment 310. For example, the equipment information includes at least one of an equipment name, sensing data, an error code, statistical data, reference data, and a operation history as illustrated in FIG. 4.

The equipment name is the name of the equipment 310. The equipment name may be the information (for example, a manufacturer code) which uniquely identifies the equipment 310 or may be the information which indicates the type (for example, a solar battery apparatus, an air-conditioning equipment, etc.) of the equipment 310.

The sensing data is the data including numerical data representing the working state of the equipment 310. The sensing data is measured by a sensor provided at the facility 300. Alternatively, the sensing data may be measured by a sensor provided at the equipment 310 or may be measured by a sensor provided at the EMS 320. The sensing data is transmitted from the EMS 320 to the equipment management apparatus 200. For example, the sensing data may be output power data of the equipment 310, power consumption data of the equipment 310, temperature data of the equipment 310, environmental temperature data of the equipment 310, environmental humidity data of the equipment 310, or the like.

The error code is a code which identifies an error of the equipment 310. The error may be detected by the equipment 310 or may be detected by the EMS 320. The error code is transmitted from the EMS 320 to the equipment management apparatus 200. For example, the error code may be a code indicating an abnormality in the temperature of the equipment 310, a code indicating an abnormality in a part provided in the equipment 310, a code indicating an abnormality in output power of the equipment 310, a code indicating an abnormality in power consumption of the equipment 310.

The statistical data is the data obtained by statistical processing of numerical data. The statistical data may be generated by the equipment management apparatus 200. Alternatively, the statistical data may be generated by the equipment 310 or may be generated by the EMS 320. For example, the statistical data may be numerical data grouped or sorted for a particular purpose. The statistical data may be, for example, the data indicating the transition (profile) of output power of the equipment 310 in a predetermined period (for example, 1 day, 1 week, or 1 month) or the data indicating the transition of power consumption of the equipment 310 in a predetermined period.

The reference data is the data including a threshold value compared with the numerical data. The reference data is a value set by a manufacturer or the like of the equipment 310. The threshold value is a value used for determining the error of the equipment 310.

The operation history is the history about drive of the equipment 310. The operation history may be transitions of a drive mode in a predetermined period (for example, 1 day, 1 week, or 1 month), may be the number of times of execution of a predetermined drive mode, or may be the number of times driving of the equipment 310 stopped. For example, if the equipment 310 is a fuel cell apparatus, the operation history may be the number of times of normal stoppages of the fuel cell apparatus or may be the number of times of emergency stoppages of the fuel cell apparatus. If the equipment 310 is a storage battery apparatus, the operation history may be the number of times of charges of the storage battery apparatus, may be the charge time of the storage battery apparatus, may be the number of times of discharges of the storage battery apparatus, may be the discharge time of the storage battery apparatus, or may be the number of charge/discharge cycles of the storage battery apparatus.

In the embodiment, the second DB 212 may store index information which associates the guidance information, the equipment information, and the user information with one another as illustrated in FIG. 4. The index information includes a combination of arbitrary characters and numbers and is not required to have a meaning by itself.

Figure 5:
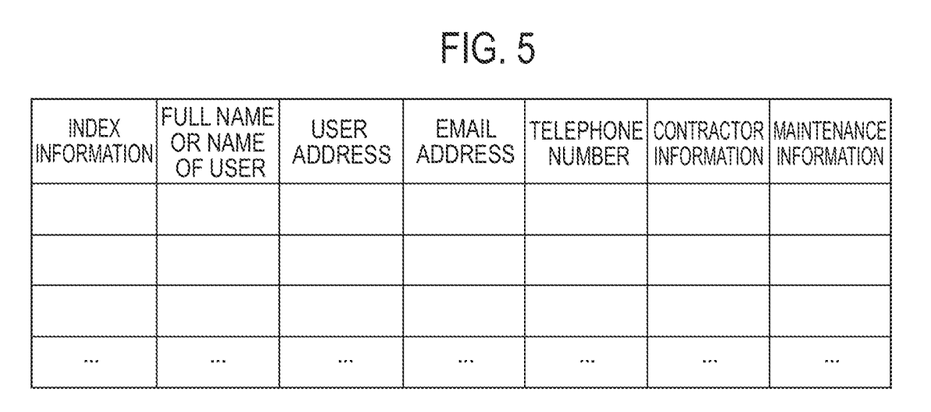
FIG. 5 is a diagram illustrating an example of information stored in a third DB 213 according to an embodiment.

The third DB 213 stores user information about users. The users may be legal persons or natural persons (individuals). For example, the user information includes at least one of the full names or names of the users, the addresses of the users, and contact information (mail addresses and phone numbers) of the users as illustrated in FIG. 5. The user information is the information to be protected. Furthermore, the user information may include at least one of contractor information and maintenance information as illustrated in FIG. 5.

The contractor information is the information about contractors which conduct transactions with users. The contractor may be a contractor which carries out maintenance. The contractor may be a manufacturer of the equipment 310. The contractor may be a company such as a power generation company, a company for power transmission and distribution, a retail company, or a resource aggregator.

The maintenance information is the information about maintenance of the equipment 310. The maintenance information may be a maintenance history or may be a maintenance schedule. The maintenance information may be accumulated by the maintenance information transmitted from the contractor terminal 400 or may be accumulated by the maintenance information input by an operator. The maintenance information may include the execution date of maintenance, the scheduled date of maintenance, and the contents of maintenance. As described above, the maintenance includes: for example, a checkup of examining the deterioration state of the equipment, upkeep of carrying out simple services during the checkup, repair of fixing problems of the equipment to recover the originally installed state of the functions and performance of the equipment, and replacement of exchanging the existing equipment for a new equipment.

In the embodiment, the third DB 213 may store index information which associates the guidance information, the equipment information, and the user information with one another as illustrated in FIG. 5. The index information includes a combination of arbitrary characters and numbers and is not required to have a meaning by itself.

The communicator 220 includes a communication module and communicates with the facilities 300 and the contractor terminal 400 via the network 120. For example, the communicator 220 receives the equipment information such as sensing data and error codes from the EMS 320. The communicator 220 receives the maintenance information from the contractor terminal 400. The communicator 220 receives the analysis results of the voice commands from the gateway apparatus 330.

The controller 230 includes, for example, a memory and a CPU and controls the configurations provided in the equipment management apparatus 200. In the embodiment, the controller 230 carries out the control shown below.

The controller 230 collects the equipment information from the EMS 320, which controls the equipment 310. The controller 230 may voluntarily collect the equipment information, which is transmitted from the EMS 320, or may collect the equipment information, which is transmitted from the EMS 320, in response to requests to the EMS 320. As described above, the equipment information is stored in the second DB 212.

The controller 230 allows the EMS 320 to access the second DB 212. On the other hand, the controller 230 prohibits the EMS 320 from accessing the third DB 213. In other words, the controller 230 is configured to prohibit the EMS 320 from accessing the third DB 213 even though the EMS 320 is allowed to access the second DB 212.

Similarly, the controller 230 may allow the contractor terminal 400 to access the second DB 212. On the other hand, the controller 230 may prohibit the contractor terminal 400 from accessing the third DB 213. In other words, the controller 230 may be configured to prohibit the contractor terminal 400 from accessing the third DB 213 even though the contractor terminal 400 is allowed to access the second DB 212.

The controller 230 may provide the equipment information to a third party. In such a case, the controller 230 deletes at least the index information. According to such a configuration, the risk that the user information might be leaked to the third party can be reduced. The third party is not particularly limited, but may be a company such as a power generation company, a company for power transmission and distribution, a retail company, or a resource aggregator.

The controller 230 allows the gateway apparatus 330 to access the first DB 211. On the other hand, the controller 230 prohibits the gateway apparatus 330 from accessing the second DB 212. In other words, the controller 230 is configured to prohibit the gateway apparatus 330 from accessing the second DB 212 even though the gateway apparatus 330 is allowed to access the first DB 211. Herein, the controller 230 may allow the gateway apparatus 330 to access the third DB 213 or may prohibit the gateway apparatus 330 from accessing the third DB 213. If a user who is allowed to access the third DB 213 inputs an voice command to the gateway apparatus 330, the controller 230 may allow the gateway apparatus 330 to access the third DB 213.

Herein, the user who inputs the voice command to the gateway apparatus 330 is conceivably a user of the equipment 310. Therefore, the user who inputs the voice command to the gateway apparatus 330 conceivably has the authority to access the second information (equipment information) stored in the second DB 212. For example, the user has the authority to access the second information via the EMS 320.

However, even if an access is based on a voice command derived from the user who has the authority to access the second information, the controller 230 prohibits the gateway apparatus 330 from accessing the second DB 212. In other words, the controller 230 prohibits the gateway apparatus 330 from accessing the second DB 212 while allowing the EMS 320 to access the second DB 212.

(Gateway Apparatus)

Figure 6:
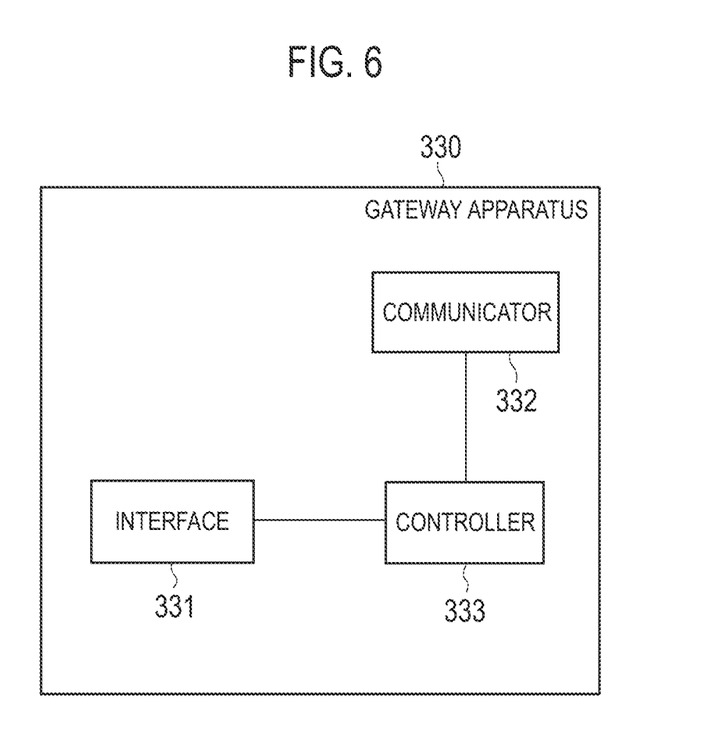
FIG. 6 is a diagram illustrating a gateway apparatus 330 according to an embodiment.

Hereinafter, the gateway apparatus according to the embodiment will be described. As illustrated in FIG. 6, a gateway apparatus 330 includes an interface 331, a communicator 332, and a controller 333.

Interface 331 includes a voice input interface that receives voice commands. Interface 331 may include a voice output interface.

The communicator 332 is configured by a communication module, and communicates with an equipment management apparatus 200 and an external server 500 via a network 120. For example, the communicator 332 receives the guidance information from the equipment management apparatus 200. The communicator 332 transmits information collected by the gateway apparatus 330 to the external server 500.

The controller 333 includes a memory, a CPU, and the like, and controls each component provided in the gateway apparatus 330. In the embodiment, the controller 333 performs the following control.

The controller 333 performs a registration process of registering a speaker whose voice command is permitted to be received. For example, the controller 333 registers the speaker in a storage medium such as a memory. The controller 333 may register a main language, a dialect, or the like spoken by the speaker in association with the speaker to be registered. The controller 333 performs an authentication process of rejecting the reception of the voice command when the speaker of the voice command is not registered, and permitting the reception of the voice command when the speaker of the voice command is registered. The controller 333 performs an authentication process for each voice command. The controller 333 performs an authentication process by determining the voiceprint of the speaker. The voiceprint determination is a process of determining whether the input voice matches the registered voice.

Here, when the reception of the voice command is permitted, the controller 333 acquires the information (guidance information described above) corresponding to the voice command from an external database while accessing the external database based on voice command. The external database is the first DB 211 described above.

First, the controller 333 performs a registration process and an authentication process during the installation operation period of an equipment 310. For example, in such a case, the speaker registered in the registration process is an installer. The controller 333 may cancel the registration of the speaker by the registration process performed during the installation operation period as a result of the expiration of the installation operation period. That is, the controller 333 may receive the voice of the installer during the installation operation period. During the installation operation period, the voice input for requesting the next work item of the installation procedure and the voice output of one work item of the installation procedure based on the installation information are repeated. Also, when the voice output of a work item with a relatively high importance is performed during the installation operation period, the voice output may be performed at a volume higher than a volume of the voice output of the work item having a relatively low importance, or a plurality of voice outputs may be performed. The voice input for requesting the next work item may be a voice input indicating that the previous work item has been completed. Thus, during the installation operation period, work items are checked by the voice input and the voice output.

Second, the controller 333 performs a registration process and an authentication process during the inspection period of the equipment 310. For example, in such a case, the speaker registered in the registration process is an inspector. The controller 333 may cancel the registration of the speaker by the registration process performed during the inspection period as a result of the expiration of the installation operation period. That is, during the inspection period, the controller 333 may receive the voice of the inspector. During the inspection period, the voice input for requesting the next inspection item of the inspection procedure and the voice output of one inspection item of the inspection procedure based on the inspection information are repeated. The voice input for requesting the next inspection item may be a voice input of a reply (for example, YES or NO) to the previous inspection item. As described above, during the inspection period, the inspection items are checked by the voice input and the voice output.

The controller 333 performs a signature process based on an input of a voice of the speaker during the inspection period in such an inspection period. The signature process is performed after the reply to the last inspection item is input by voice. In other words, the controller 333 expires the inspection period by the signature process.

Third, the controller 333 performs a registration process and an authentication process during the use period of the equipment 310. For example, in such a case, the speaker registered in the registration process is a user of the equipment 310. The controller 333 may cancel the registration of the speaker by the registration process performed during the inspection period when a predetermined period has elapsed since the registration process was performed. During the use period, the voice input for requesting the operation item of the use procedure and the voice output of the operation item based on the use information are performed.

The controller 333 may omit the authentication process for a certain period or a certain number of times when a voice command is received by the authentication process during the use period. That is, the controller 333 may receive, for a certain period or for a certain number of times, a voice command of a speaker who is not registered when the voice command of the registered speaker is received.

(Voice Command Method)

Hereinafter, the voice command method according to the embodiment will be described.

Figure 7:
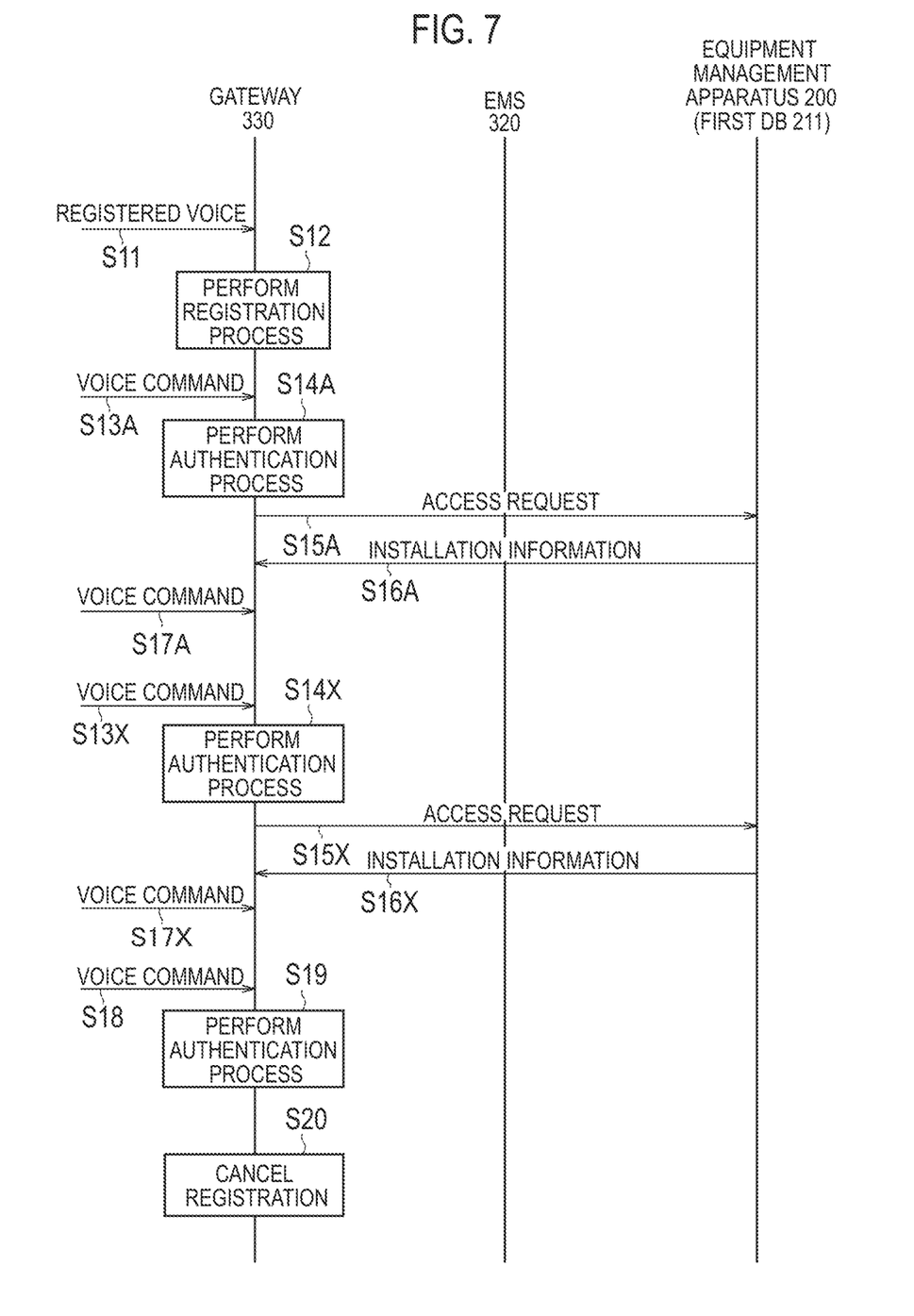
FIG. 7 is a diagram illustrating a voice command method according to an embodiment.

First, the installation operation period will be described with reference to FIG. 7. As illustrated in FIG. 7, in step S11, a registered voice is input to the gateway apparatus 330.

In step S12, the gateway apparatus 330 performs a registration process of registering a speaker whose voice command is permitted to be received.

In step S13A, the voice command requesting the next work item in the installation procedure is input to gateway apparatus 330. In step S14A, the gateway apparatus 330 performs an authentication process of determining whether the speaker of the voice command is registered. Here, the description is continued assuming that the speaker of the voice command is registered. In step S15A, the gateway apparatus 330 accesses the first DB 211. In step S16A, the gateway apparatus 330 receives the installation information from the first DB 211. The gateway apparatus 330 outputs a work item based on the installation information by voice. In step S17A, a voice indicating that the work item has been completed is input to the gateway apparatus 330.

As illustrated in steps S13X to S17X, such a process is repeated until the installation of the equipment 310 is completed. As described above, the voice input for requesting the next work item may be a voice input indicating that the previous work item has been completed. That is, the voice input in step S17A may also serve as the voice input in step S13X.

In step S18, a voice command indicating that installation of the equipment 310 is completed is input to the gateway apparatus 330. In step S19, the gateway apparatus 330 performs an authentication process of determining whether the speaker of the voice command is registered. Here, the description is continued assuming that the speaker of the voice command is registered. In step S20, the gateway apparatus 330 cancels the registration of the speaker performed in step S12.

Figure 8:
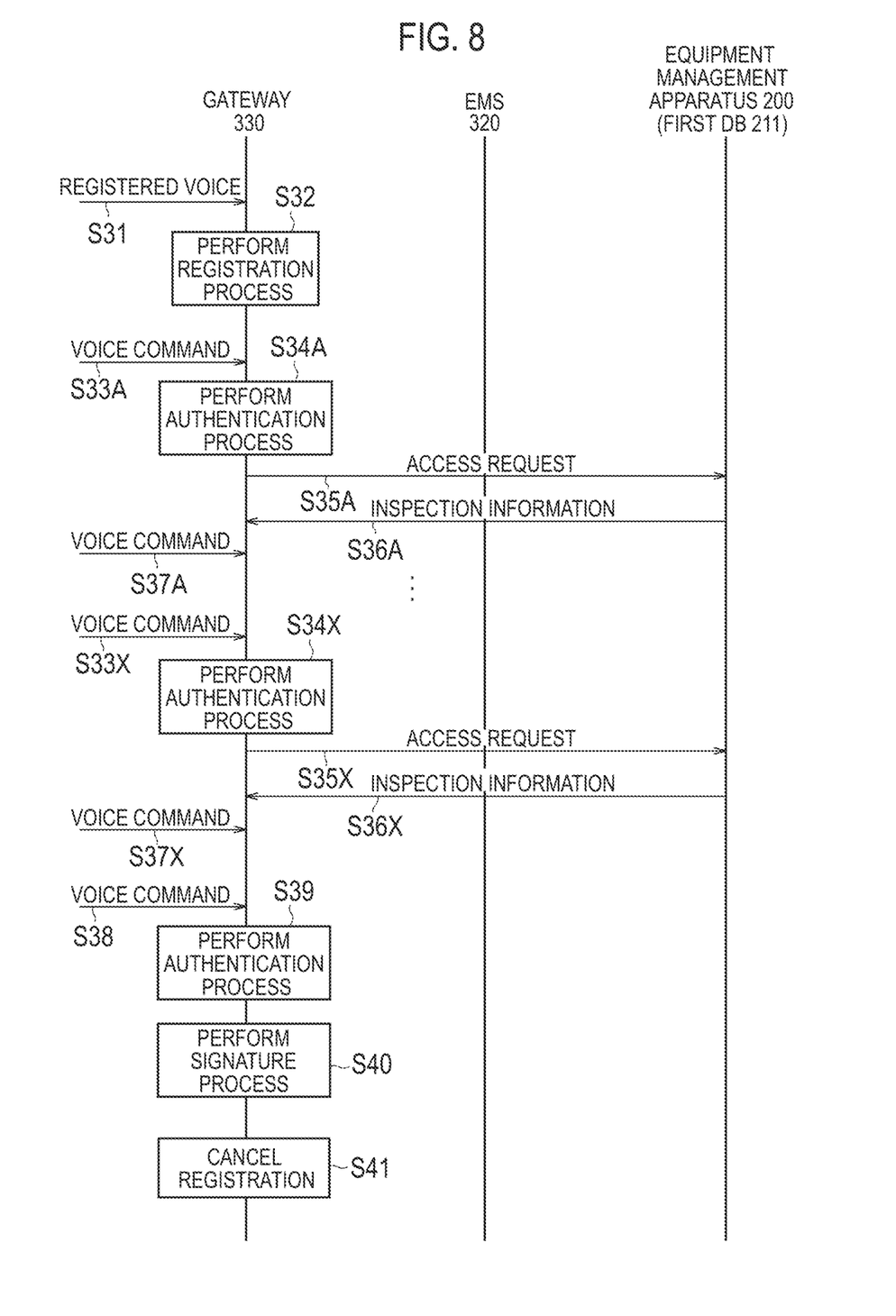
FIG. 8 is a diagram illustrating a voice command method according to an embodiment.

Second, the inspection period will be described with reference to FIG. 8. As illustrated in FIG. 8, in step S31, a registered voice is input to the gateway apparatus 330.

In step S32, the gateway apparatus 330 performs a registration process of registering a speaker whose voice command is permitted to be received.

In step S33A, a voice command requesting the next inspection item of the inspection procedure is input to the gateway apparatus 330. In step S34A, the gateway apparatus 330 performs an authentication process of determining whether the speaker of the voice command is registered. Here, the description is continued assuming that the speaker of the voice command is registered. In step S35A, the gateway apparatus 330 accesses the first DB 211. In step S36A, the gateway apparatus 330 receives the inspection information from the first DB 211. The gateway apparatus 330 outputs the inspection item based on the inspection information by voice. In step S37A, the voice of the reply to the inspection item is input to the gateway apparatus 330.

As illustrated in steps S33X to S37X, such a process is repeated until the inspection of the equipment 310 is completed. As described above, the voice input for requesting the next inspection item may be a voice input of a reply to the previous inspection item. That is, the voice input in step S37A may also serve as the voice input in step S33X.

In step S38, a voice command indicating that the inspection of the equipment 310 is completed is input to the gateway apparatus 330. In step S39, the gateway apparatus 330 performs an authentication process of determining whether the speaker of the voice command is registered. Here, the description is continued assuming that the speaker of the voice command is registered. In step S40, the gateway apparatus 330 performs a signature process based on an input of a voice of the speaker. In step S41, the gateway apparatus 330 cancels the registration of the speaker performed in step S32.

Figure 9:
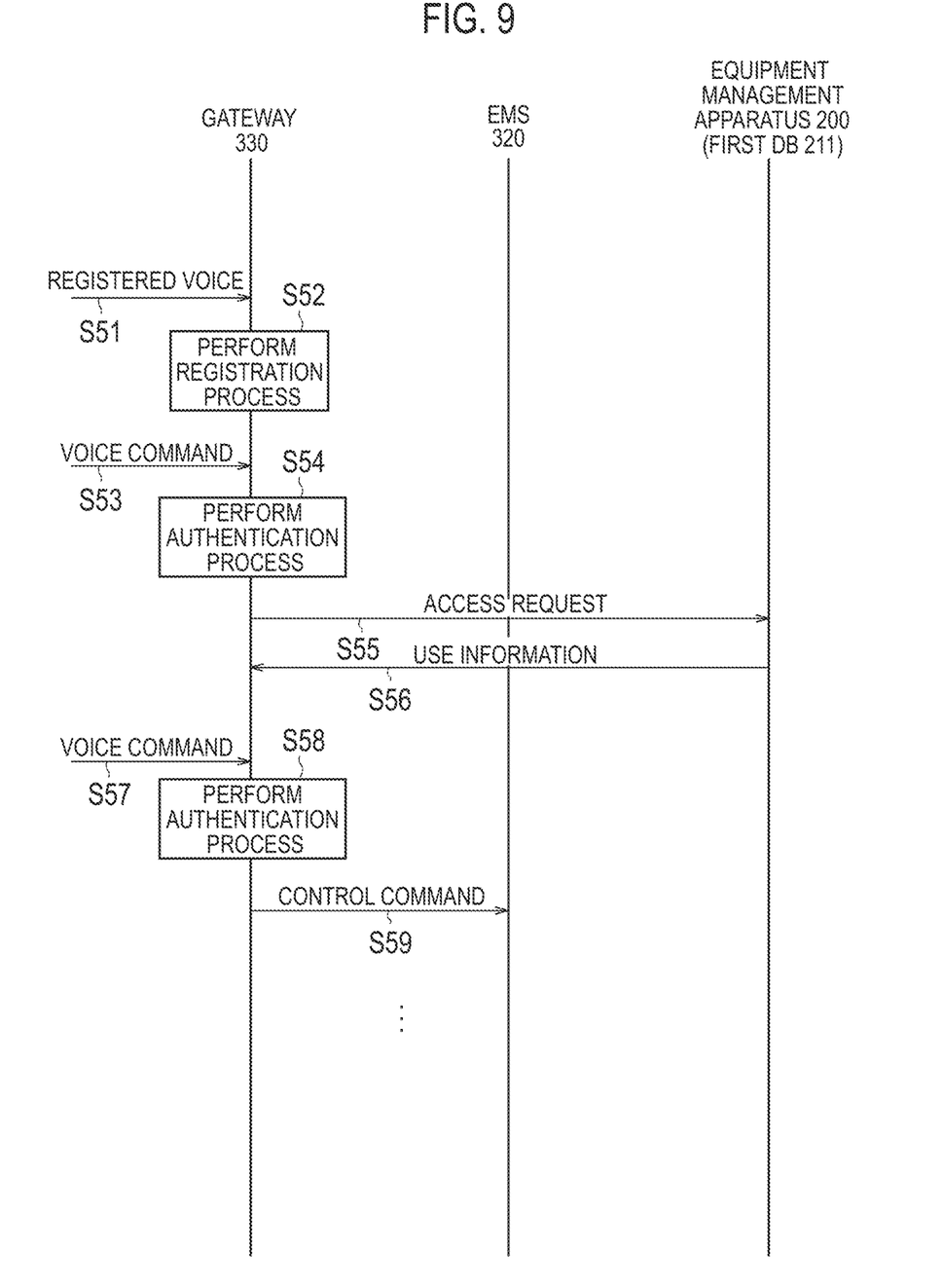
FIG. 9 is a diagram illustrating a voice command method according to an embodiment.

Third, the use period will be described with reference to FIG. 9. As illustrated in FIG. 9, in step S51, a registered voice is input to the gateway apparatus 330.

In step S52, the gateway apparatus 330 performs a registration process of registering a speaker whose voice command is permitted to be received.

In step S53, a voice command requesting an operation item of the use procedure is input to the gateway apparatus 330. In step S54, the gateway apparatus 330 performs an authentication process of determining whether the speaker of the voice command is registered. Here, the description is continued assuming that the speaker of the voice command is registered. In step S55, the gateway apparatus 330 accesses the first DB 211. In step S56, the gateway apparatus 330 receives the use information from the first DB 211. The gateway apparatus 330 outputs operation items based on the use information by voice.

In step S57, a voice command for the equipment 310 is input to the gateway apparatus 330 based on the operation item. In step S58, the gateway apparatus 330 performs an authentication process of determining whether the speaker of the voice command is registered. Here, the description is continued assuming that the speaker of the voice command is registered. In step S59, the gateway apparatus 330 transmits a control command based on the voice command to the EMS 320.

(Function and Effect)

In the embodiment, the gateway apparatus 330 performs an authentication process for each voice command. According to such a configuration, a situation in which voice commands of a plurality of speakers present near the gateway apparatus 330 are received is suppressed, and it may not be possible to properly support the installation, the inspection, the use, and the like of the equipment 310.

In the embodiment, the equipment management apparatus 200 is configured to prohibit the gateway apparatus 330 from accessing the second DB 212. According to such a configuration, since the gateway apparatus 330, which may transmit various information to the external server 500, is prohibited from accessing the second DB 212, the risk that the second information belonging to the know-how of the entity, which runs the equipment management apparatus 200, might be leaked to another entity can be reduced.

In the embodiment, the equipment management apparatus 200 is configured to allow the gateway apparatus 330 to access the first DB 211. According to such a configuration, since part of the information stored in the equipment management apparatus 200 is provided, the convenience of users is improved.

Other Embodiments

The present invention has been described by the above described embodiment. However, the discussions and drawings forming part of this disclosure should not be construed to limit the present invention. According to this disclosure, various alternative embodiments, examples, and running techniques will be apparent to those skilled in the art.

Although not specifically mentioned in the embodiment, the voice input of a password registered in advance to the gateway apparatus 330 may be requested to start the registration process. In the registration process, two or more speakers may be registered. When two or more voice commands are input within a predetermined time, in the case where a plurality of speakers is registered, the gateway apparatus 330 may receive a voice command with the highest volume. The gateway apparatus 330 need not receive a voice command with a volume lower than the predetermined volume.

As described in the embodiment, the gateway apparatus 330 may omit the authentication process for a certain period or a certain number of times when a voice command is received by the authentication process in the use period. In such a case, the certain period or the certain number of times may be determined according to the importance of the voice command. Further, the gateway apparatus 330 may perform the authentication process for each voice command without omitting the authentication process for a specific voice command (a voice command having a high importance).

Although not specifically mentioned in the embodiment, the gateway apparatus 330 may cancel the registration of the speaker by remote control in preparation for theft of the gateway apparatus 330 or the like.

In the embodiment, the first DB 211, the second DB 212, and the third DB 213 are physically different databases. However, embodiments are not limited thereto. The first DB 211, the second DB 212, and the third DB 213 may be formed by one database and virtually separated from one another by setting access authorities.

In the embodiment, the first DB 211, the second DB 212, and the third DB 213 are provided in the equipment management apparatus 200. However, embodiments are not limited thereto. At least any one of the first DB 211, the second DB 212, and the third DB 213 may be provided in a server connected to the equipment management apparatus 200 via the network 120.

Although it is not particularly mentioned in the embodiment, the functions of the equipment management apparatus 200 may be provided by a cloud service.

In the embodiment, the access controller, which prohibits the gateway apparatus 330 from accessing the second DB 212, is provided in the equipment management apparatus 200. However, embodiments are not limited thereto. The access controller, which prohibits the gateway apparatus 330 from accessing the second information, may be provided in the gateway apparatus 330. In other words, the gateway apparatus 330 may autonomously prohibit itself from accessing the second DB 212.

In the embodiment, a control apparatus which controls the equipment 310 is the EMS 320. However, embodiments are not limited thereto. The control apparatus may be the equipment 310 per se. The control apparatus may be a remote controller, which transmits control commands to the equipment 310.

It is not particularly mentioned in the embodiment, the equipment management apparatus 200 (controller 230) may set, for each entity which accesses the equipment information, the access authority of information elements included in the equipment information. For example, the equipment management apparatus 200 may allow the EMS 320 to access the sensing data and prohibit the contractor terminal 400 from accessing the sensing data. Alternatively, the equipment management apparatus 200 may allow the contractor terminal 400 to access the operation history and prohibit the EMS 320 from accessing the statistical data.

In the embodiment, the entities which access the equipment information are the EMS 320 and the contractor terminal 400. However, embodiments are not limited thereto. The entity may be a user terminal belonging to a user of the equipment 310. In such a case, the equipment management apparatus 200 may allow the user terminal to access the operation history and prohibit the user terminal from accessing the sensing data.

Although it is not particularly mentioned in the embodiment, the equipment information may include basic information such as installation date, predetermined durable years, and rated power consumption.

Although not specifically mentioned in the embodiment, at least part of the processing performed by the gateway apparatus 330 (controller 333) described above may be performed by the EMS 320 (controller included in the EMS 320) or the equipment management apparatus 200 (controller 230). For example, the above-described registration process and authentication process performed by the gateway apparatus 330 (controller 333) are performed by the EMS 320 (controller included in the EMS 320) or the equipment management apparatus 200 (controller 221). The EMS 320 (controller included in EMS 320) or the equipment management apparatus 200 (controller 221) acquires necessary information about the voice of the speaker from gateway apparatus 330, and may perform a registration process and an authentication process based on the information.

The invention claimed is:

1. A voice command system, comprising:
a gateway apparatus including an interface configured to receive a voice command; and
a controller configured to perform a registration process of registering a speaker whose voice command is permitted to be received, wherein
the controller is configured to perform an authentication process of rejecting a reception of the voice command when a speaker of the voice command is not registered, and permitting a reception of the voice command when a speaker of the voice command is registered,
the controller is configured to perform the authentication process for each the voice command, the controller is configured to perform the registration process and the authentication process during an installation operation period of an equipment,
the installation operation period of the equipment is a period that installation of the equipment is performed,
the equipment includes a power generation equipment, and
the voice command includes a first voice command requesting an operation item of a use procedure and a second voice command for the equipment based on the operation item.

2. The voice command system according to claim 1, wherein the gateway apparatus has the controller.

3. The voice command system according to claim 1, wherein the controller is configured to access an external database based on the voice command when the reception of the voice command is permitted, and acquire, from the external database, information corresponding to the voice command.

4. The voice command system according to claim 3, further comprising:
a first database configured to store first information permitted access from the gateway apparatus;
a second database configured to store second information prohibited access from the gateway apparatus; and
an access controller configured to permit access to the first database from the gateway apparatus and prohibit access to the second database from the gateway apparatus, wherein
the external database is the first database, and
the second information includes equipment information collected from a control apparatus that controls the equipment.

5. The voice command system according to claim 4, wherein the first database and the second database are physically different databases.

6. The voice command system according to claim 4, wherein the equipment information includes at least one of: sensing data including numerical data representing an operation state of the equipment; an error code identifying an error of the equipment; statistical data obtained by statistical processing of the numerical data; reference data including a threshold value compared with the numerical data; and an operation history of the equipment.

7. The voice command system according to claim 1, wherein the controller is configured to cancel, with an expiration of the installation operation period, registration of the speaker performed by the registration process in the installation operation period.

8. The voice command system according to claim 1, wherein the controller is configured to perform the authentication process by determining a voiceprint of the speaker.

9. A voice command system, comprising:
a gateway apparatus including an interface configured to receive a voice command; and
a controller configured to perform a registration process of registering a speaker whose voice command is permitted to be received, wherein
the controller is configured to perform an authentication process of rejecting a reception of the voice command when a speaker of the voice command is not registered, and permitting a reception of the voice command when a speaker of the voice command is registered,
the controller is configured to perform the authentication process for each the voice command,
the controller is configured to perform the registration process and the authentication process during an inspection period of an equipment,
the inspection period of the equipment is a period that the equipment is inspected after installation of the equipment,
the equipment includes a power generation equipment, and
the voice command includes a first voice command requesting an operation item of a use procedure and a second voice command for the equipment based on the operation item.

10. The voice command system according to claim 9, wherein the controller is configured to cancel, with an expiration of the inspection period, registration of the speaker performed by the registration process in the inspection period.

11. The voice command system according to claim 9, wherein the controller is configured to perform a signature process based on a voice input of the speaker during the inspection period.

12. The voice command system according to claim 11, wherein the controller is configured to expire the inspection period by the signature process.

13. A voice command system comprising:
a gateway apparatus including an interface configured to receive a voice command; and
a controller configured to perform a registration process of registering a speaker whose voice command is permitted to be received, wherein
the controller is configured to perform an authentication process of rejecting a reception of the voice command when a speaker of the voice command is not registered, and permitting a reception of the voice command when a speaker of the voice command is registered,
the controller is configured to perform the authentication process for each the voice command,
the controller is configured to perform the registration process and the authentication process during a use period of an equipment,
the voice command includes a first voice command requesting an operation item of a use procedure and a second voice command for the equipment based on the operation item, and
the equipment includes a power generation equipment.

14. A voice command method, comprising:
receiving a voice command;
performing a registration process of registering a speaker whose voice command is permitted to be received; and
performing an authentication process of rejecting a reception of the voice command when a speaker of the voice command is not registered, and permitting a reception of the voice command when a speaker of the voice command is registered, wherein
the authentication process is performed for each the voice command,
the registration process and the authentication process are both performed
during an installation operation period of equipment, wherein the installation operation period of the equipment is a period that installation of the equipment is performed, or
during an inspection period of the equipment, wherein the inspection period of the equipment is a period that the equipment is inspected after the installation of the equipment, or during a use period of the equipment, wherein, during the use period, the voice command includes a first voice command requesting an operation item of a use procedure and a second voice command for the equipment based on the operation item, and the equipment including a power generation equipment.

15. The voice command method according to claim 14, wherein the registration process and the authentication process are both performed during the installation operation period of the equipment, the method further comprising:

cancelling, with an expiration of the installation operation period, registration of the speaker performed by the registration process in the installation operation period.

16. The voice command method according to claim 14, wherein the registration process and the authentication process are both performed during the inspection period of the equipment, the method further comprising:

cancelling, with an expiration of the inspection period, registration of the speaker performed by the registration process in the inspection period.

17. The voice command method according to claim 14, wherein the registration process and the authentication process are both performed during the inspection period of the equipment, the method further comprising:

performing a signature process based on a voice input of the speaker during the inspection period.

18. The voice command method according to claim 17, further comprising: expiring the inspection period by the signature process.

* * * * *